(12) United States Patent
Yuen et al.

(10) Patent No.: US 11,182,225 B1
(45) Date of Patent: Nov. 23, 2021

(54) METHOD AND APPARATUS FOR CLOUD SERVICE PROVIDER EVENTS GENERATION AND MANAGEMENT

(71) Applicant: JPMorgan Chase Bank, N.A., New York, NY (US)

(72) Inventors: Timmy Yuen, Singapore (SG); Lois Blanc, Singapore (SG); Lianne Lee, Singapore (SG); Ian Miller, New Barnet (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/906,724

(22) Filed: Jun. 19, 2020

(51) Int. Cl.
  *G06F 9/54* (2006.01)
  *G06F 16/958* (2019.01)
  *H04L 12/24* (2006.01)
  *H04L 29/08* (2006.01)

(52) U.S. Cl.
  CPC .......... *G06F 9/542* (2013.01); *G06F 16/958* (2019.01); *H04L 41/0609* (2013.01); *H04L 41/5096* (2013.01); *H04L 67/16* (2013.01)

(58) Field of Classification Search
  None
  See application file for complete search history.

(56) References Cited

U.S. PATENT DOCUMENTS

| | | | |
|---|---|---|---|
| 9,135,093 B2* | 9/2015 | Boller | G06F 11/3006 |
| 9,544,361 B2* | 1/2017 | Boddhu | G06N 20/00 |
| 10,286,255 B2* | 5/2019 | Balakrishnan | G16H 20/30 |
| 10,505,881 B2* | 12/2019 | Bray | H04L 51/22 |
| 10,674,214 B2* | 6/2020 | Carlson | G06F 16/489 |
| 2014/0068629 A1* | 3/2014 | Boller | G06F 11/0709 719/313 |
| 2018/0189669 A1* | 7/2018 | Jeon | G06N 20/00 |
| 2019/0317835 A1* | 10/2019 | French | G06F 16/2477 |

* cited by examiner

*Primary Examiner* — Umut Onat
(74) *Attorney, Agent, or Firm* — Greenblum & Bernstein, P.L.C.

(57) ABSTRACT

Various methods, apparatuses/systems, and media for automatic generation and management of cloud service provider events are provided. A service provider computing device defines a maturity level of an event; publishes an event schema associated with the maturity level of the event; and transmits the event to an event platform that is configured to provide infrastructure for event production and consumption. The event platform validates the event based on the event schema; calculates a validation score for the event upon validation of the event; and publishes the validation score on a website. A consumer computing device consumes the published event from the event platform.

17 Claims, 11 Drawing Sheets

METHOD AND APPARATUS FOR CLOUD SERVICE PROVIDER EVENTS GENERATION AND MANAGEMENT

TECHNICAL FIELD

This disclosure generally relates to cloud service provider events, and, more particularly, to methods and apparatuses for implementing a cloud provider events generation module to standardize and ease the generation and management of cloud service provider events and to maximize their value for cloud consumers.

BACKGROUND

The advent of cloud-based computing architectures has opened new possibilities for the rapid and scalable deployment of virtual Web stores, media outlets, and other on-line sites or services. In general, a cloud-based architecture may deploy a set of hosted resources such as processors, operating systems, software and other components that can be combined or strung together to form virtual machines. A cloud-based architecture may be composed of a plurality of platforms and services, for example, compute platform as a service, database as a service, event stream as a service, etc. Each of these services is typically built iteratively by an independent team—called cloud service providers (CSPs).

To meet market demands in an extremely competitive landscape, SPs may need to continuously add new features to their services. Those features may evolve rapidly, often requiring to have a new functionality available in production every few weeks. Thus, the detailed design and data model of those services may also evolve with the same extreme pace.

To enable consumers to understand the behavior of their service, SPs may publish streams of operational, system health and audits events describing the change of state of the service and of the resources it offers to customers. Those events may belong to the overall telemetry domain, alongside system metrics and logs.

Developing, maintaining, and communicating the data model and the underlying data contract of those events may prove to be difficult and done in an ad hoc, often confusing fashion. In addition, as functionalities are added to their services events, generation may fail, or their actual semantic may be inconsistent with what was published previously.

Consumers may need to understand what events are being published, their semantic, their data model, and the underlying data contract—how reliable is the event, etc. Based on this, consumers will know if they can use the event and the data they hold for human debugging purpose, or for higher value activities such as automation.

In the current state, SPs have no method and system to drive the events and their data contract definition, publication, and quality management. Typically, it is extremely hard for consumers to build reliably high value feature such as automation based on the events published. Consumers operations remain manual over time wasting precious human resources.

SUMMARY

The present disclosure, through one or more of its various aspects, embodiments, and/or specific features or sub-components, may provide, among others, various systems, servers, devices, methods, media, programs, and platforms for implementing a cloud provider events generation module to standardize and ease the generation and management of cloud provider events via automation, thereby maximizing events' value for cloud consumers, but the disclosure is not limited thereto. In addition, the present disclosure, through one or more of its various aspects, embodiments, and/or specific features or sub-components, may further provide, among others, various systems, servers, devices, methods, media, programs, and platforms for implementing a cloud provider events module for enabling SPs to define and communicate easily the set of events they publish, how reliable they are and how to validate them via automation, but the disclosure is not limited thereto. The present disclosure, through one or more of its various aspects, embodiments, and/or specific features or sub-components, may also provide, among others, various systems, servers, devices, methods, media, programs, and platforms for implementing a cloud provider events module to provide consumers with a machine consumable mechanism to find out which events are published, what are their semantic, what data contract governs them, and if they can be used for "eyes on glass" (i.e., requiring constant monitoring) consumption, automated alerting or automated operations, but the disclosure is not limited thereto.

According to an aspect of the present disclosure, a method for generation and management of cloud service provider events by utilizing one or more processors and one or more memories is disclosed. The method may include: defining, by a service provider computing device, a maturity level of an event; publishing an event schema associated with the maturity level of the event; transmitting the event to an event platform that is configured to provide infrastructure for event production and consumption; validating, by the event platform, the event based on the event schema; calculating, by the event platform, a validation score for the event upon validation of the event; publishing the validation score on a web site; and consuming, by a consumer computing device, the published event from the event platform.

According to another aspect of the present disclosure, the method may further include: publishing a list of available service providers in a cloud event catalog that is provided by an event platform computing device, the cloud event catalog describing each service provider's event via the service provider's event schemas; and receiving, by the consumer computing device, information about availability and lifecycle state of event types.

According to yet another aspect of the present disclosure, the method may further include calculating the validation score for each event type by utilizing the cloud event catalog.

According to a further aspect of the present disclosure, the published event may be relatively less matured and may include a new functionality, the method may further include: executing gradual maturation of the event or data contract in parallel to supported functionality provided by the service provider computing device, wherein the data contract may be granular and may be applied to the event or a subset of an attribute of the event.

According to yet another aspect of the present disclosure, the method may further include: publishing the validation score on a website; accessing the website by the service provider computing device for the event publication; and accessing the website by the consumer computing device for the event consumption.

According to an additional aspect of the present disclosure, the method may include: automatically verifying, by the consumer computing device, the published event, the event's semantic, what data contract governs the published event, and whether the event is mature to a level for consumption that requires continuous monitoring; and consuming, by the consumer computing device, the published event based on the automatic verification.

According to yet another aspect of the present disclosure, the method may further include executing standard data formats enabling the consumer computing device to receive information about the availability and the lifecycle state of the published event.

According to another aspect of the present disclosure, a system for generation and management of cloud service provider events is disclosed. The system may include: a memory storing information for generation and management of cloud service provider events; and a processor operatively connected to the memory via a communication network. The processor may be configured to: allow a service provider computing device to: define a maturity level of an event; publish an event schema associated with the maturity level of the event; and transmit the event to an event platform that is configured to provide infrastructure for event production and consumption. The processor may validate the event based on the event schema; calculate a validation score for the event upon validation of the event; publish the validation score on a web site; and allow a consumer computing device to consume the published event from the event platform.

According to further aspect of the present disclosure, the processor may be further configured to: publish a list of available service providers in a cloud event catalog that is provided by an event platform computing device, the cloud event catalog describing each service provider's event via the service provider's event schemas; and allow the consumer computing device to receive information about availability and lifecycle state of event types.

According to yet another aspect of the present disclosure, the processor may be further configured to calculate the validation score for each event type by utilizing the cloud event catalog.

According to an additional aspect of the present disclosure, the published event may be relatively less matured and may, in time, include a new functionality; the processor may be further configured to: allow the service provider to gradually mature the event or data contract in parallel to supported functionality provided by a service provider computing device, wherein the data contract is granular and applied to the event or a subset of an attribute of the event.

According to yet another aspect of the present disclosure, the processor may be further configured to: publish the validation score on a website, wherein the service provider computing device accesses the website for the event publication; and wherein the consumer computing device accesses the website for the event consumption.

According to another aspect of the present disclosure, wherein the consumer computing device automatically verifies the published event, the event's semantic, what data contract governs the published event, and whether the event is mature to a level for consumption that requires continuous monitoring; and wherein the consumer computing device consumes the published event based on the automatic verification.

According to yet another aspect of the present disclosure, the processor may be further configured to execute standard data formats enabling the consumer computing device to receive information about the availability and the lifecycle state of the published event.

According to an additional aspect of the present disclosure, a non-transitory computer readable medium may be configured to store instructions for generation and management of cloud service provider events is disclosed. The instructions, when executed, may cause a processor to perform the following: allowing a service provider computing device to: define a maturity level of an event; publish an event schema associated with the maturity level of the event; and transmit the event to an event platform that is configured to provide infrastructure for event production and consumption. The instructions, when executed, may cause the processor to further perform the following: validating the event based on the event schema; calculating a validation score for the event upon validation of the event; publishing the validation score on a website; and allowing a consumer computing device to consume the published event from the event platform.

According to still another aspect of the present disclosure, the instructions, when executed, may further cause the processor to perform the following: publishing a list of available service providers in a cloud event catalog that is provided by an event platform computing device, the cloud event catalog describing each service provider's event via the service provider's event schemas; and configuring the consumer computing device to receive information about availability and lifecycle state of event types.

According to another aspect of the present disclosure, the instructions, when executed, may further cause the processor to calculate the validation score for each event type by utilizing the cloud event catalog.

According to an aspect of the present disclosure, the instructions, when executed, may further cause the processor to publish and validate score on a website, wherein the service provider computing device accesses the website for the event publication; and wherein the consumer computing device accesses the website for the event consumption.

According to a further aspect of the present disclosure, the instructions, when executed, may further cause the processor to execute standard data formats enabling the consumer computing device to receive information about the availability and the lifecycle state of the published event.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
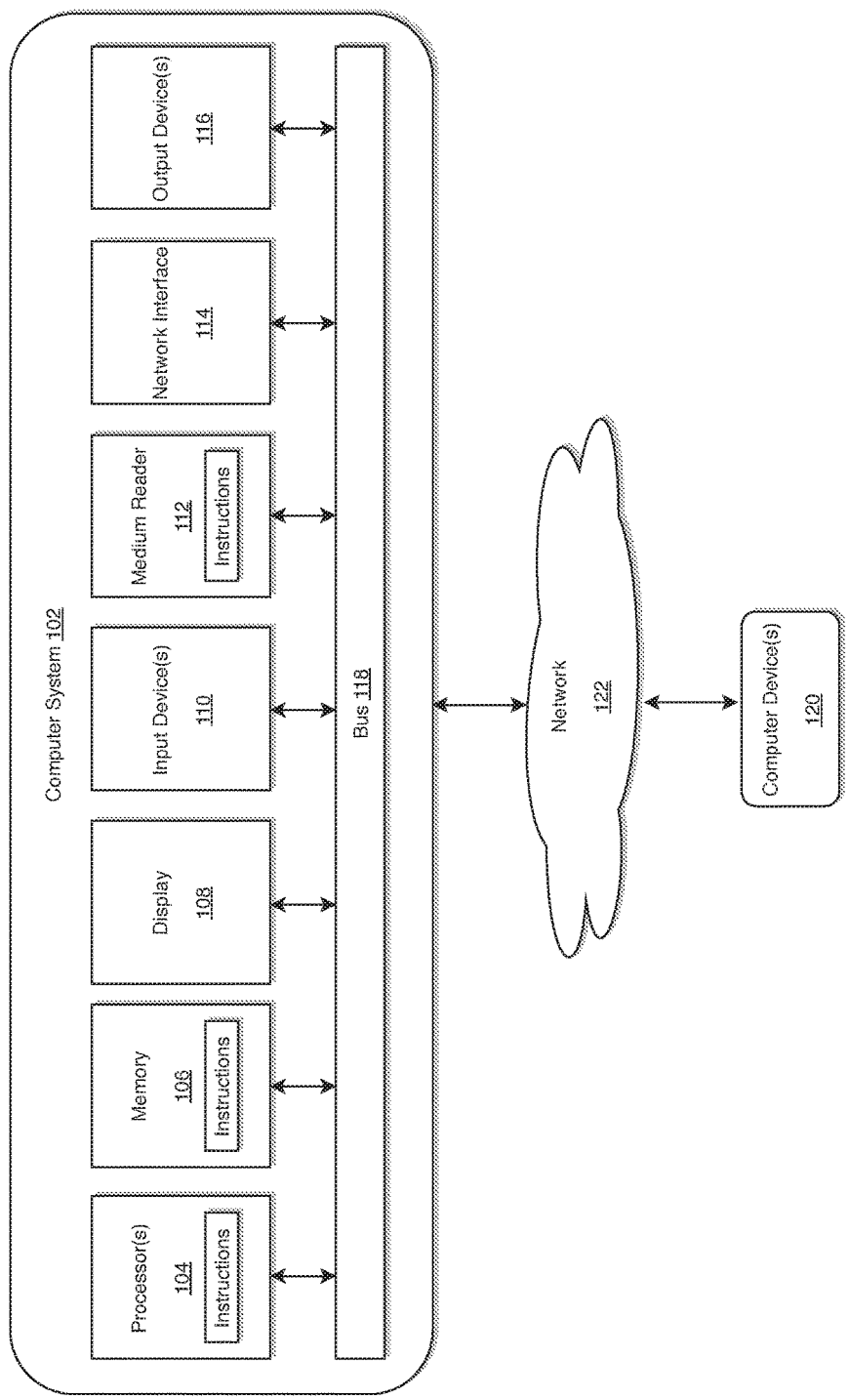
FIG. 1 illustrates a computer system for implementing a cloud provider events generation device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices and/or modules. Those skilled in the art will appreciate that these blocks, units, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, and/or modules being implemented by microprocessors or similar, they may be programmed using software (e.g., microcode) to perform various functions discussed herein and may optionally be driven by firmware and/or software. Alternatively, each block, unit, device, and/or module may be implemented by dedicated hardware, or as a combination of dedicated hardware to perform some functions and a processor (e.g., one or more programmed microprocessors and associated circuitry) to perform other functions. Also, each block, unit, device, and/or module of the example embodiments may be physically separated into two or more interacting and discrete blocks, units, devices, and/or modules without departing from the scope of the inventive concepts. Further, the blocks, units, devices, and/or modules of the example embodiments may be physically combined into more complex blocks, units, devices, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, BLUETOOTH®, ZIG-BEE®, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment . . . .

As described herein, various embodiments provide optimized processes of implementing a cloud provider events generation module to standardize and ease the generation and management of cloud provider events via automation, thereby maximizing events' value for cloud consumers, but the disclosure is not limited thereto. As described herein, various embodiments may further provide optimized processes of implementing a cloud provider events module for enabling SPs to define and communicate easily the set of events they publish, how reliable they are and how to validate them via automation, but the disclosure is not limited thereto. As described herein, various embodiments may further provide optimized processes of implementing a cloud provider events module to provide consumers with a machine consumable mechanism to find out which events are published, what are their semantic, what data contract governs them, and if they can be used for "eyes on glass" (i.e., requiring constant monitoring) consumption, automated alerting or automated operations, but the disclosure is not limited thereto.

Figure 2:
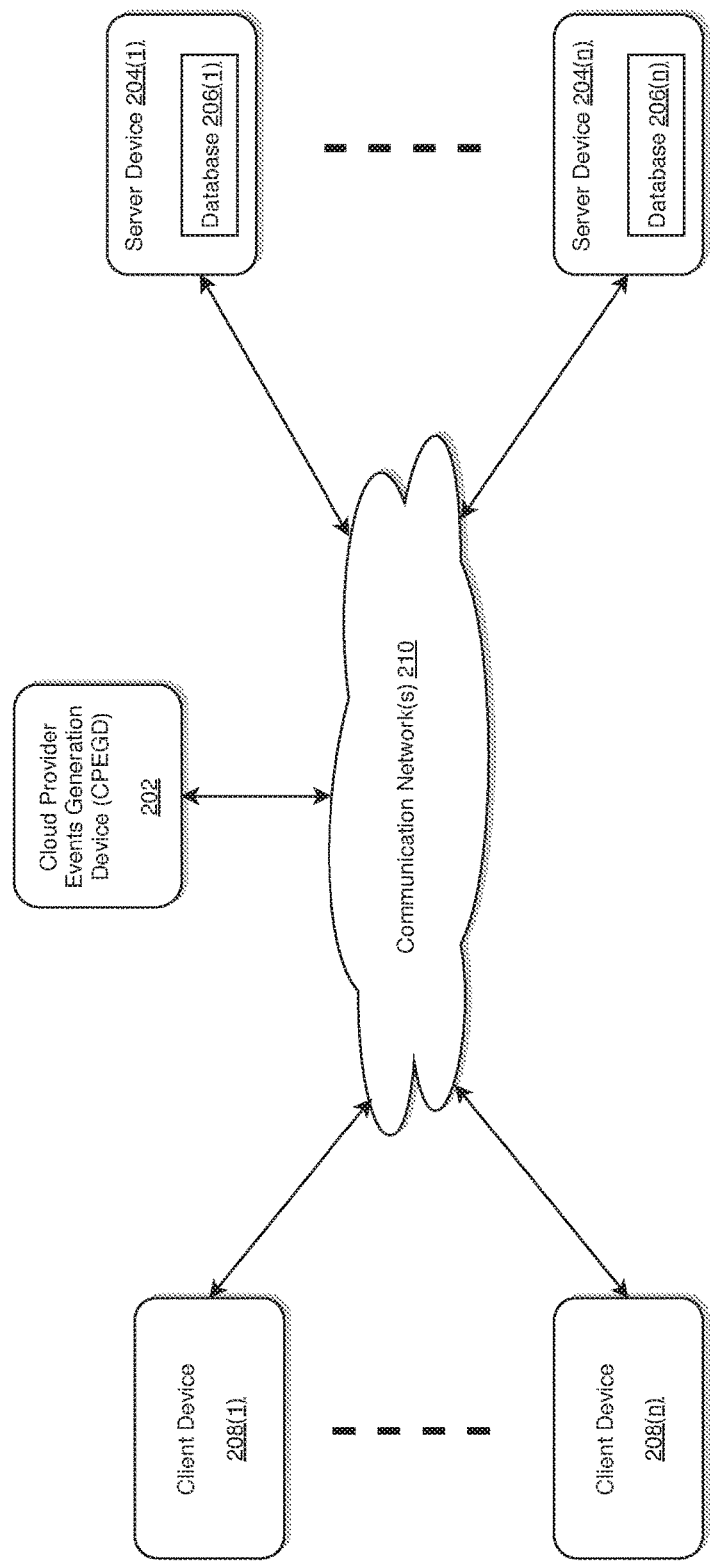
FIG. 2 illustrates an exemplary diagram of a network environment with a cloud provider events generation device in accordance with an exemplary embodiment.

Referring to FIG. 2, a schematic of an exemplary network environment 200 for implementing a cloud provider events generation device (CPEGD) of the instant disclosure is illustrated.

Conventional system, that does not implement a CPEGD of the instant disclosure, may not be able to standardize and ease the generation and management of cloud provider events via automation.

According to exemplary embodiments, the above-described problems associated with conventional system may be overcome by implementing a CPEGD 202 having a cloud provider events generation module as illustrated in FIG. 2 by allowing generation and management of cloud provider events via automation, thereby maximizing events' value for cloud consumers, but the disclosure is not limited thereto.

The CPEGD 202 may be the same or similar to the computer system 102 as described with respect to FIG. 1.

The CPEGD 202 may store one or more applications that can include executable instructions that, when executed by the CPEGD 202, cause the CPEGD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CPEGD 202 itself, may be located in virtual server(s) running in a cloud-based computing environment rather than being tied to one or more specific physical network computing devices. Also, the application(s) may be running in one or more virtual machines (VMs) executing on the CPEGD 202. Additionally, in one or more embodiments of this technology, virtual machine(s) running on the CPEGD 202 may be managed or supervised by a hypervisor.

In the network environment 200 of FIG. 2, the CPEGD 202 is coupled to a plurality of server devices 204(1)-204(n) that hosts a plurality of databases 206(1)-206(n), and also to a plurality of client devices 208(1)-208(n) via communication network(s) 210. A communication interface of the CPEGD 202, such as the network interface 114 of the computer system 102 of FIG. 1, operatively couples and communicates between the CPEGD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CPEGD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s)(WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CPEGD 202 may be a standalone device or integrated with one or more other devices or apparatuses, such as one or more of the server devices 204(1)-204(n), for example. In one particular example, the CPEGD 202 may be hosted by one of the server devices 204(1)-204(n), and other arrangements are also possible. Moreover, one or more of the devices of the CPEGD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CPEGD 202 via the communication network(s) 210 according to the HTTP-based and/or JAVASCRIPT® Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CPEGD 202 that may be configured for enabling SPs to define and communicate easily the set of events they publish, how reliable they are and how to validate them via automation. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the CPEGD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CPEGD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CPEGD 202, the server devices 204(1)-204(n), or the client devices 208(1)-208(n), for example, may be configured to operate as virtual instances on the same physical machine. For example, one or more of the CPEGD 202, the server devices 204(1)-204(n), or the client devices 208(1)-208(n) may operate on the same physical device rather than as separate devices communicating through communication network(s) 210. Additionally, there may be more or fewer CPEGDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
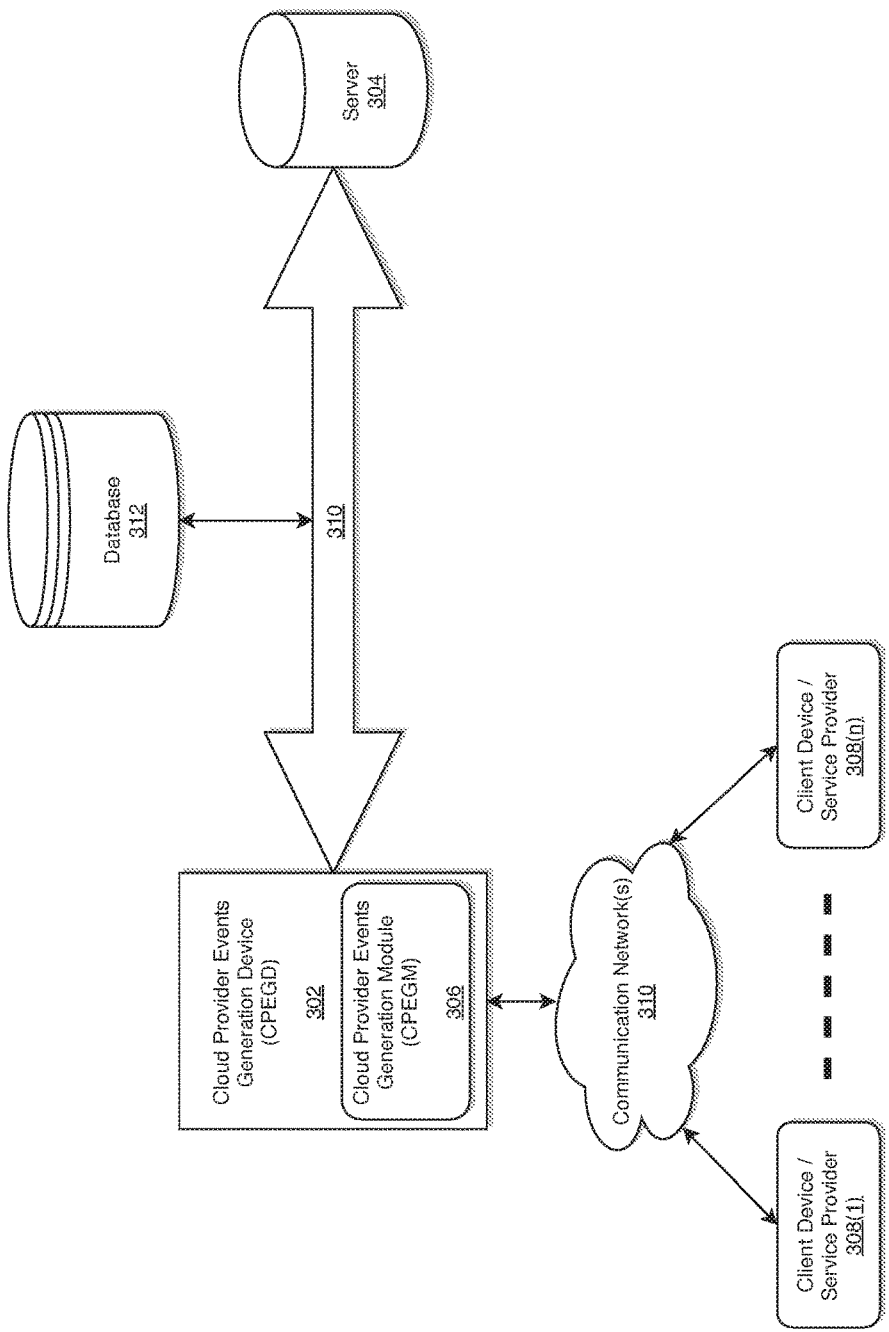
FIG. 3 illustrates a system diagram for implementing a cloud provider events generation device with a cloud provider events generation module in accordance with an exemplary embodiment.

FIG. 3 illustrates a system diagram for implementing a cloud provider events generation device (CPEGD) with a cloud provider events generation module (CPEGM) in accordance with an exemplary embodiment.

As illustrated in FIG. 3, in the system 300, the CPEGD 302 including the CPEGM 306 may be connected to a server 304, and database 312 via a communication network 310. The CPEGD 302 may also be connected to a plurality of client devices 308(1)-308(n) via the communication network 310, but the disclosure is not limited thereto. According to exemplar embodiments, the plurality of client devices 308(1)-308(n) may include one or more service provider computing devices and one or more consumer computing devices.

According to exemplary embodiments, the CPEGD 302 is described and shown in FIG. 3 as including the CPEGM 306, although it may include other rules, policies, modules, databases, or applications, for example. According to exemplary embodiments, the database 312 may be embedded within the CPEGD 302. According to exemplary embodiments, the database 312 may be configured to store information including: rules, schemas, programs, etc., but the disclosure is not limited thereto.

According to exemplary embodiments, the CPEGM 306 may be configured to provide a much simpler way, compared to conventional methods or systems, to publish event schemas; send events to an event platform that provides infrastructure for event production and consumption and publish a list of available service providers in a cloud event catalog.

According to exemplary embodiments, the CPEGM 306 may be configured to receive data from the database 312 via the communication network 310.

As will be described below, the CPEGM 306 may be configured to define, by a service provider computing device, a maturity level of an event; publish an event schema associated with the maturity level of the event; and transmit the event to an event platform that is configured to provide infrastructure for event production and consumption. As will be described below, the CPEGM 306 may be configured to validate the event based on the event schema; calculate a validation score for the event upon validation of the event; publish the event onto the event platform; and allow a consumer computing device to consume the published event from the event platform, but the disclosure is not limited thereto.

The plurality of client devices 308(1)-308(n) are illustrated as being in communication with the CPEGD 302. In this regard, the plurality of client devices 308(1)-308(n) may be "clients" of the CPEGD 302 and are described herein as such. Nevertheless, it is to be known and understood that the plurality of client devices 308(1)-308(n) need not necessarily be "clients" of the CPEGD 302, or any entity described in association therewith herein. Any additional or alternative relationship may exist between either or more of the plurality of client devices 308(1)-308(n) and the CPEGD 302, or no relationship may exist. For example, one or more of the client devices 308(1)-308(n) may include computing devices utilized by service providers and one or more of the client devices 308(1)-308(n) may include computing devices utilized by consumers.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the CPEGD 302 via broadband or cellular communication. Of course, these embodiments are merely exemplary and are not limiting or exhaustive.

Figure 4:
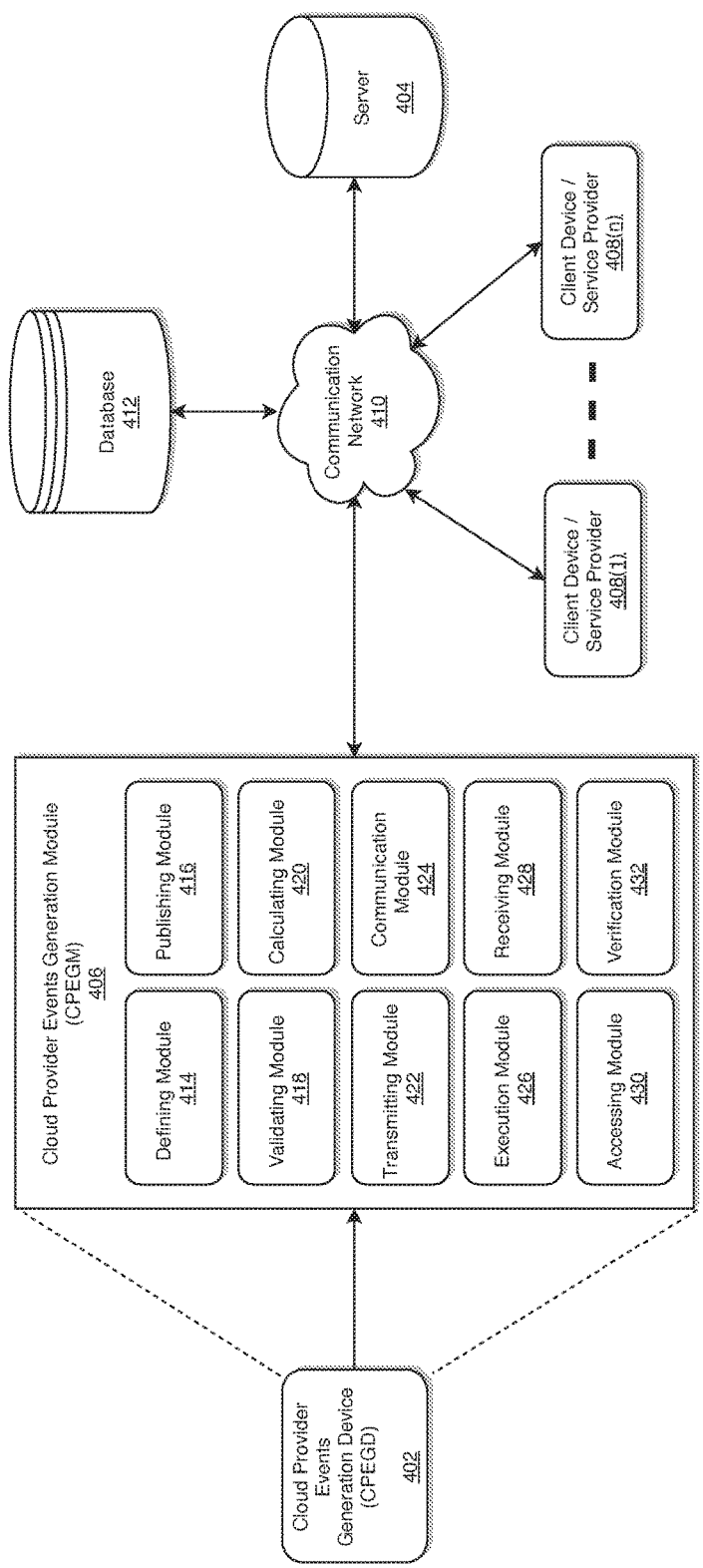
FIG. 4 illustrates a system diagram for implementing a cloud provider events generation module of FIG. 3 in accordance with an exemplary embodiment.

FIG. 4 illustrates a system diagram for implementing a cloud provider events generation module of FIG. 3 in accordance with an exemplary embodiment. As illustrated in FIG. 4, the system 400 may include a cloud provider events generation device (CPEGD) 402 within which a cloud provider events generation module (CPEGM) 406 may be embedded, a database 412, a server 404, client devices 408(1)-408(n), and a communication network 410. According to exemplary embodiments, the CPEGD 402, CPEGM 406, database 412, the server 404, the client devices 408(1)-408(n), and the communication network 410 as illustrated in FIG. 4 may be the same or similar to the CPEGD 302, CPEGM 306, database 312, the server 304, the client devices 308(1)-308(n), and the communication network 310, respectively, as illustrated in FIG. 3. According to exemplary embodiments, cloud provider events may also be referred to as service provider events. According to exemplary embodiments, the CPEGD 402 may also be referred to as an event platform computing device and the CPEGM 406 may also be referred to as an event platform.

As illustrated in FIG. 4, the CPEGM 406 may include a defining module 414, a publishing module 416, a validating module 418, a calculating module 420, a transmitting module 422, a communication module 424, an execution module 426, a receiving module 428, an accessing module 430, and a verification module 432. According to exemplary embodiments, the database 412 may be external to the CPEGD 402 may include various systems that are managed and operated by an organization. Alternatively, according to exemplary embodiments, the database 412 may be embedded within the CPEGD 402.

The process may be executed via the communication network 410, which may comprise plural networks as described above. For example, in an exemplary embodiment, the various components of the CPEGM 406 may communicate with the server 404, and the database 412 via the communication network 410 and the communication module 430. Of course, these embodiments are merely exemplary and are not limiting or exhaustive.

According to exemplary embodiments, the communication network 410 and the communication module 430 may be configured to establish a link between the database 412, the client devices 408(1)-408(n) and the CPEGM 406.

According to exemplary embodiments, each of the defining module 414, publishing module 416, validating module 418, calculating module 420, transmitting module 422, communication module 424, execution module 426, receiving module 428, accessing module 430, and the verification module 432 may be implemented by microprocessors or similar, they may be programmed using software (e.g., microcode) to perform various functions discussed herein and may optionally be driven by firmware and/or software. Alternatively, each of the defining module 414, publishing module 416, validating module 418, calculating module 420, transmitting module 422, communication module 424, execution module 426, receiving module 428, accessing module 430, and the verification module 432 may be implemented by dedicated hardware, or as a combination of dedicated hardware to perform some functions and a processor (e.g., one or more programmed microprocessors and associated circuitry) to perform other functions. Also, according to exemplary embodiments, each of the defining module 414, publishing module 416, validating module 418, calculating module 420, transmitting module 422, communication module 424, execution module 426, receiving module 428, accessing module 430, and the verification module 432 may be physically separated into two or more interacting and discrete blocks, units, devices, and/or modules without departing from the scope of the inventive concepts.

Figure 5:
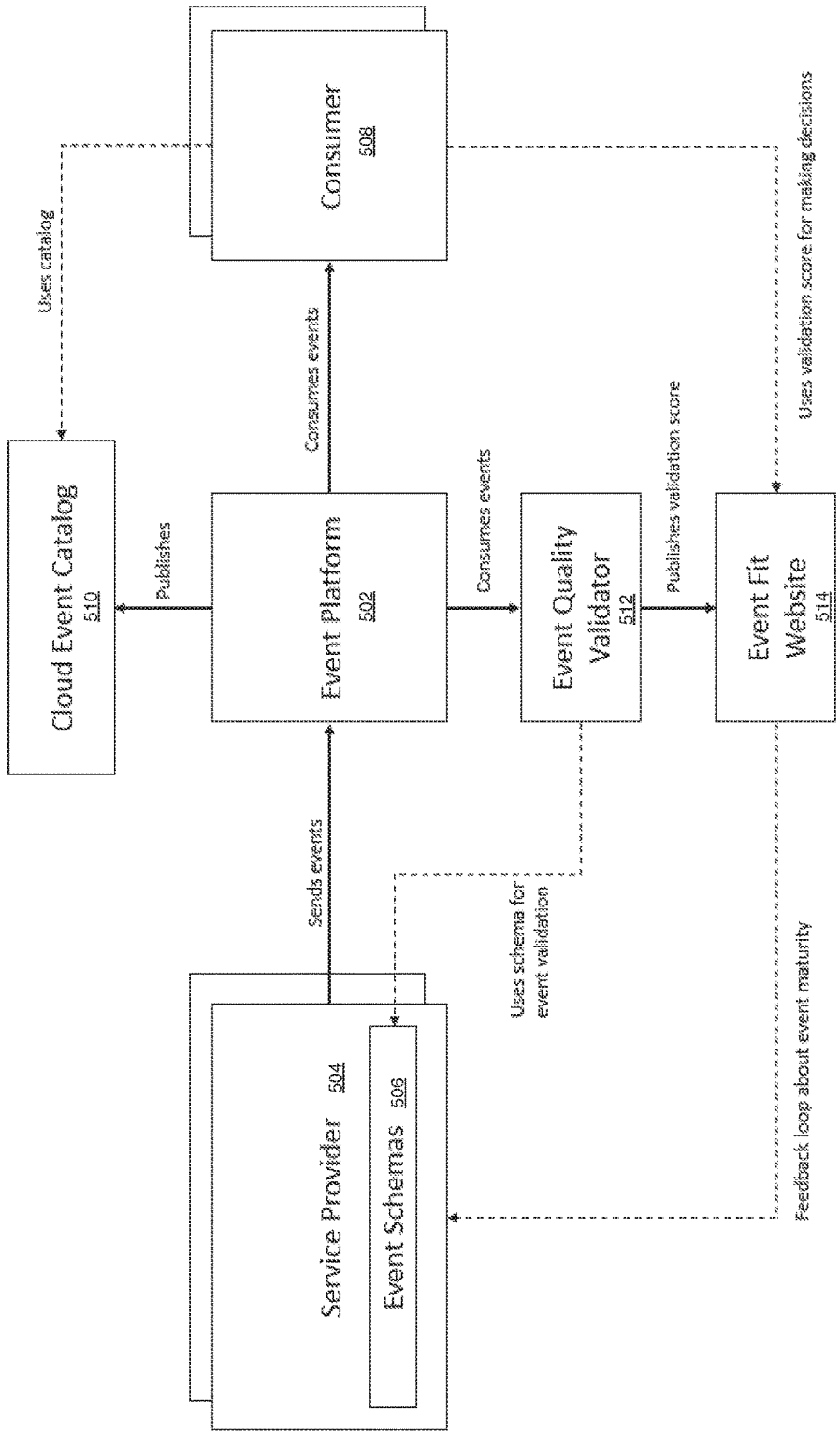
FIG. 5 illustrates an exemplary diagram of cloud provider events generation process in accordance with an exemplary embodiment.

According to exemplary embodiments. FIG. 5 illustrates an exemplary diagram of cloud provider events generation process in accordance with an exemplary embodiment. As illustrated in FIG. 5, the process 500 illustrates interconnection among a service provider 504, event schemas 506, event platform 502, consumer 508, cloud event catalog 510, event quality validator 512, and an event fit website 514.

According to exemplary embodiments, the service provider 504, by utilizing a computing device (e.g., one or more of the client device/service provider 408(1)-408(n)) may publish event schemas (see, e.g., FIG. 6), may send events to the event platform 502, and may utilize event fit to determine maturity level of events.

The following tables illustrate exemplary event maturity model standards: basis, foundational, and mature.

TABLE 1

| Basic event sample | Requirements |
|---|---|
| {<br>　"id": "123456789",<br>　"type": "com.organization.service.update",<br>　"specversion": "1.0",<br>　"source": "https://service.instance-0100",<br>　"time": "2020-02-02T01:23:45Z",<br>　"meta": {<br>　　"eventcontractversion": "1.0",<br>　　"serviceproviderid": "89898",<br>　　"env": "prod"<br>　},<br>　# other optional attributes as per CNCF Cloud Event spec<br>　"data": {<br>　　"message": "Hello World! This service crashed."<br>　}<br>} | Basic events must follow schema version 1.0 provided by the event platform, which:<br>　meets the CNCF Cloud event standard v1.0<br>　has attribute "time"as described in CNCF Cloud event standard v1.0<br>　has meta which consists of the minimal attributes:<br>　　eventcontractversion - must be 1.0<br>　　serviceproviderid - to identify service providing the event resource<br>　　env - environment of the resource<br>　validates against the schema Common Base Schema below |

TABLE 2

| Foundational event sample | Requirements |
|---|---|
| {<br>　"id": "123456789",<br>　"type": "com.organization.service.crash",<br>　"specversion": "1.0",<br>　"source": "https://service.instance-0100 ",<br>　"time": "2020-02-02T01:23:45Z",<br>　"meta": {<br>　　"eventcontractversion": "2.1",<br>　　"serviceproviderid": "89898",<br>　　"env": "prod",<br>　　"tenantid": "12345"<br>　},<br>　"data": {<br>　　"message": "Hello World! This prod service hosting application 12345 has crashed."<br>　}<br>} | Foundational events must follow schema version 2.x provided by the event platform, which meets Basic event spec, and:<br>　has the meta attributes:<br>　　eventcontractversion - must be 2.x<br>　　tenantid<br>　has key metadata, source, and type described in a machine readable JSON schema. The JSON schema forms the contract with the consumer. |

TABLE 3

| Mature event sample | Requirements |
|---|---|
| {<br>  "id": "12345678",<br>  "type": "com.organization.service.crash",<br>  "specversion": "1.0",<br>  "source": "https://service.instance-0100",<br>  "time": "2020-02-02T01:23:45Z",<br>  "meta": {<br>    "eventcontractversion": "3.3",<br>    "serviceproviderid": "89898",<br>    "env": "prod",<br>    "tenantid": "12345"<br>  },<br>  "data": {<br>    "message": "Hello World! This prod service hosting application 12345 has crashed."<br>    "severity": "high",<br>    "exit_description": "2 error(s) occurred:\n\n* 1 error(s) occurred:\n\n* Exited with status 1\n* cancelled"<br>    "reason": "CRASHED"<br>  },<br>  "dataschema": "https://89898.organization.com/schema/com.organization.app.crash?eventcontractversion=3.3"<br>} | Mature events must follow schema version 3.x provided by the event platform, which meets Foundational event spec, and:<br>  has the meta attribute:<br>    eventcontractversion - must be 3.x<br>  has key attributes of the data payload, if included, described in a machine readable JSON schema. The JSON schema forms the contract with the consumer. |

Referring to FIGS. 4-7, according to exemplary embodiments, the defining module 414 may configure a service provider computing device (one of the client device/service provider 408(1)-408(n), or a computing device utilized by the service provider 504) to define a maturity level of an event.

According to exemplary embodiments, the publishing module 416 may be configured to publish an event schema 506 associated with the maturity level of the event. The transmitting module 422 may be configured to transmit the event to an event platform 502 that is configured to provide infrastructure for event production and consumption. The validating module 418 may configure an event quality validator 512 to validate the event based on the event schema 506.

According to exemplary embodiments, the calculating module 420 may be configured to calculate a validation score for the event upon validation of the event.

According to exemplary embodiments, the publishing module 416 may be configured to publish the event onto the event platform 502 and the execution module 426 may configure a consumer computing device (another one of the client device 408(1)-408(n), or a computing device utilized by the consumer 508) to consume the published event from the event platform 502.

According to exemplary embodiments, the publishing module 416 may be configured to publish a list of available service providers 504 in a cloud event catalog 510 that is provided by an event platform computing device (e.g., a computing device utilized by the service provider 504), the cloud event catalog 510 describing each service provider's 504 event via the service provider's event schemas. The consumer computing device may be configured to receive information about availability and lifecycle state of event types by utilizing the receiving module 428.

According to exemplary embodiments, the calculating module 420 may be configured to calculate the validation score for each event type by utilizing the cloud event catalog 510.

Figure 6:
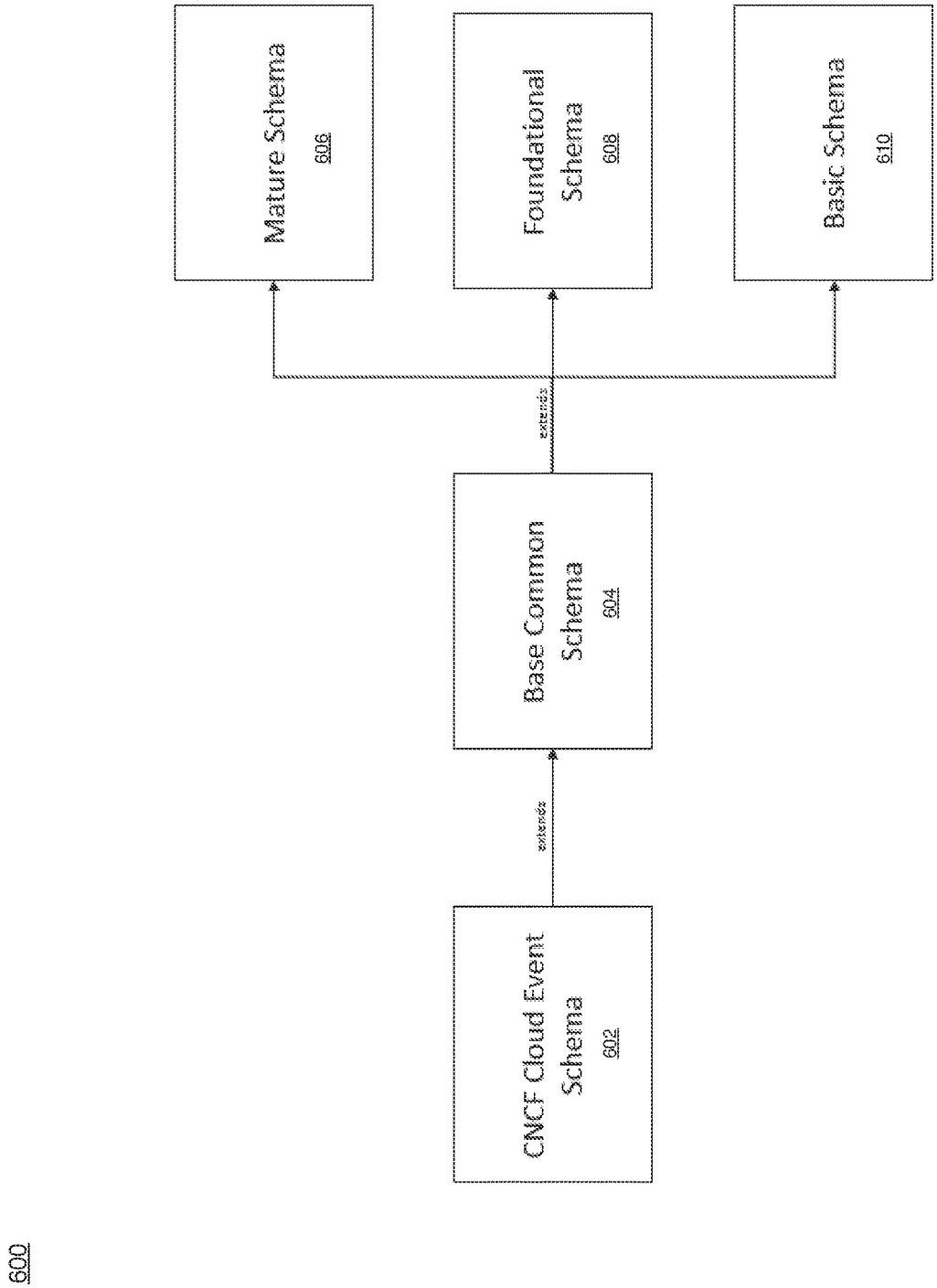
FIG. 6 illustrates an exemplary diagram of schemas in cloud provider events generation process in accordance with an exemplary embodiment.

FIG. 6 illustrates an exemplary diagram of schemas in cloud provider events generation process in accordance with an exemplary embodiment.

As illustrated in FIG. 6, the exemplary diagram of schemas 600 represents the hierarchy of the schemas provided by an event platform operator. According to exemplary embodiments, FIG. 6 illustrates a CNCF (Cloud Native Computing Foundation) cloud event schema 602 and base common schema 604, where the mature schema 606, foundational schema 608, and basic schema 610 are composition of schemas based on the CNCF cloud event schema 602 and the base common schema 604. Event schemas provided by the service provider must be based on the basic, foundational or mature schema.

According to exemplary embodiments, the CNCF cloud event schema 602 may include the following:

```
{
  "$id": "https://github.com/cloudevents",
  "$schema": "https://json-schema.org/draft/2019-09/schema",
  "type": "object",
  "properties": {
    "id": {
      "description": "Identifies the event. Producers MUST ensure that source + id is unique for each distinct event. If a duplicate event is re-sent (e.g. due to a network error) it MAY have the same id. Consumers MAY assume that Events with identical source and id are duplicates.",
      "type": "string",
      "pattern": "^(?!\\s*$).+"
    },
```

```
    "specversion": {
        "description": "The version of the CloudEvents specification which the
event uses. This enables the interpretation of the context. Compliant event
producers MUST use a value of 1.0 when referring to this version of the
specification.",
        "type": "string",
        "pattern": "^(?!\\s*$).+"
    },
    "source": {
        "description": "Identifies the source of the event. ",
        "type": "string",
        "pattern": "^(([^:/?#]+):)?(//([^/?#]*))?([^? #]*)(\\\\?([^#]*))?(#(.*))?"
    },
    "type": {
        "description": "This attribute contains a value describing the type of
event related to the originating occurrence. Often this attribute is used for
routing, observability, policy enforcement, etc. See more at
https://github.com/cloudevents/spec/blob/v1.0/spec.md",
        "type": "string"
    },
    "datacontenttype": {
        "description": "Content type of data value",
        "type": "string"
    },
    "dataschema": {
        "description": "Identified the schema that data adheres to",
        "type": "string",
        "pattern":
"^(([^:/?#]+):)?(//([^/?#]*))?([^?#]*)(\\\\?([^#]*))?(#(.*))?"
    },
    "subject": {
        "description": "This describes the subject of the event in the context
of the event producer (identified by source).",
        "type": "string",
        "pattern": " (?!\\s*$).+"
    },
    "time": {
        "description": "Timestamp of when the occurrence happened",
        "type": "string",
        "pattern": "^(-?(?:[1-9][0-9]*)?[0-9]{4})-(1[0-2]|0[1-9])-(3[01]|0[1-
9]|[12][0-9])T(2[0-3]|[01][0-9]):([0-5][0-9]):([0-5][0-9])(\\\\.[0-9]+)?(Z)?$"
    }
},
"required": ["id", "source", "specversion", "type"]
}
```

According to exemplary embodiments, the base common schema 604 may include the following:

```
{
  "$id": "https://events-
schema.organization.com/schema/common?eventcontractversion=1.0",
  "$schema": "https://json-schema.org/draft/2019-09/schema",
  "allOf ": [{
      "$ref ": "https://events-
schema.organization.com/schema/cloudevent_spec?version=1.0"
    }
  ],
  "type": "objec ",
  "properties": {
    "meta": {
      "type": "object",
      "description": "Event metadata used for routing, entitlement and
validation.",
      "properties": {
        "serviceproviderid":
          "description": "Service Provider id",
          "type": "string"
        },
        "env": {
          "description": "the environment from where the event was
originated from",
          "type": "string",
          "pattern": "^(dev|test|prod)$"
        },
        "eventcontractversion": {
          "description": "Version of the contract that the event adhere
to.",
          "type": "string"
        },
```

```
          "tenantid": {
            "description": "Identifies the account leasing the resource",
            "type": "string"
          }
        },
        "required": ["serviceproviderid", "eventcontractversion", "env"]
      }
    },
    "required": ["meta", "time"]
```
According to exemplary embodiments, the basic schema 610 may include the following:
```
{
  "$schema": "https://json-schema.org/draft/2019-09/schema",
  "$id": "https://events-schema.organization.com/schema/basic?eventcontractversion=1.0",
  "allOf": [{"$ref": "https://events-schema.organization.com/schema/common?eventcontractversion=1.0"}],
  "type": "object",
  "properties": {
    "meta": {
      "type": "object",
      "description": "Event metadata used for routing, entitlement and validation.",
      "properties": {
        "eventcontractversion": {
          "description": "Version of the contract that the event adhere to.",
          "type": "string",
          "pattern": "1\\.0"
        }
      }
    }
  }
}
```
According to exemplary embodiments, the foundational schema 608 may include the following:
```
{
  "$schema": "https://json-schema.org/draft/2019-09/schema",
  "$id": "https://events-schema.organization.comischema/foundational?eventcontractversion=2.0",
  "allOf ": [{
      "$ref ": "https://events-schema.organization.com/schema/common?eventcontractversion=1.0" }
  ],
  "type": "object",
  "properties": {
    "meta": {
      "type": "object",
      "description": "Event metadata used for routing, entitlement and validation.",
      "properties": {
        "eventcontractversion": {
          "description": "Version of the contract that the event adhere to.",
          "type": "string",
          "pattern": "^2\\.[0-9]+"
        }
      },
      "required": ["tenantid"]
    }
  }
}
```
According to exemplary embodiments, the mature schema 606 may include the following:
```
{
  "$schema": "https://json-schema.org/draft/2019-09/schema",
  "$id": "https://events-schema.organization.comischemaimature?eventcontractversion=3.0-gfs",
  "allOf": [{"$ref": "https://events-schema.organization.comischema/common?eventcontractversion=1.0" }],
  "type": "object",
  "properties": {
    "dependencies": {
      "data": {
        "required": ["dataschema"]
      },
```

-continued

```
    "meta": {
       "properties": {
          "eventcontractversion": {
             "description": "Version of the contract that the event
adhere to.",
             "type": "string",
             "pattern": "^3\\.[0-9]+"
          }
       },
       "required": ["tenantid"]
     }
    }
   }
}
```

According to exemplary embodiments, the published event may be relatively less matured and may include a new functionality, and the execution module 426 may be configured to execute gradual maturation of the event or data contract in parallel to supported functionality provided by a service provider computing device (one of the client device/service provider 408(1)-408(n), or a computing device utilized by the service provider 504). According to exemplary embodiments, the data contract may be granular and may be configured to be applied to the event or a subset of an attribute of the event.

According to exemplary embodiments, the publishing module 416 may be configured to publish the validation score on a website (i.e., an event fit website 514) and the execution module 426 may allow the service provider computing device (one of the client device/service provider 408(1)-408(n), or a computing device utilized by the service provider 504) to access the website (i.e., the event fit website 514) for the event publication by utilizing the accessing module 430. According to exemplary embodiments, the execution module 426 may further allow the consumer computing device (another one of the client device 408(1)-408(n), or a computing device utilized by the consumer 508) to access the website (i.e., the event fit website 514) for the event consumption by utilizing the accessing module 430.

According to exemplary embodiments, the execution module 426 may allow the consumer computing device (another one of the client device 408(1)-408(n), or a computing device utilized by the consumer 508) by utilizing the verification module 432 to automatically verify the published event, the event's semantic, what data contract governs the published event, and whether the event is mature to a level for consumption that requires continuous monitoring. According to exemplary embodiments, the execution module 426 may further allow the consumer computing device (another one of the client device 408(1)-408(n), or a computing device utilized by the consumer 508) to consume the published event based on the automatic verification by the verification module 432.

According to exemplary embodiments, the execution module 426 may be configured to execute standard data formats enabling the consumer computing device (another one of the client device 408(1)-408(n), or a computing device utilized by the consumer 508) to receive, by utilizing the receiving module 428, information about the availability and the lifecycle state (see, e.g., FIG. 7) of the published event.

Figure 7:
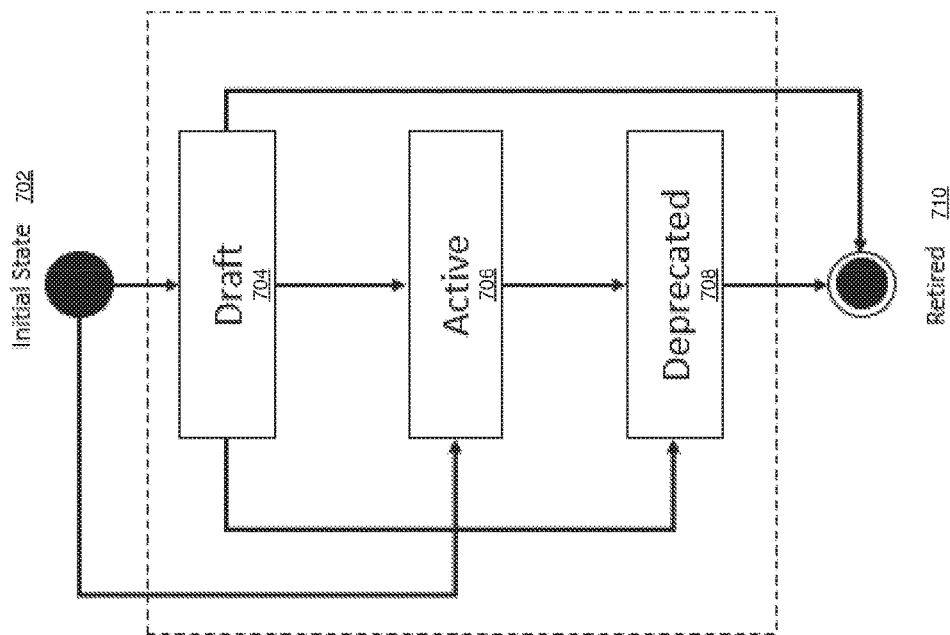
FIG. 7 illustrates an exemplary event type lifecycle model in accordance with an exemplary embodiment.

For example, FIG. 7 illustrates an exemplary event type lifecycle model 700 in accordance with an exemplary embodiment. As illustrated in FIG. 7, the exemplary event type lifecycle model 700 shows the process flow from an initial state 702 to a retired state 710 of an event via draft 704, active 706, and deprecated 708 states.

According to exemplary embodiments, the initial state 702 may correspond to event type specification that may not made known to consumers 508, and does not have a schema. The draft state 704 may correspond to event type specification that may be experimental but made known to consumers 508 via a versioned schema (see, e.g., FIG. 6). Events published by the service provider 504 may conform to this schema, however, consumers 508 should expect constant updates and should be aware that this specification may be deprecated 708 or retired 710. The event type schema may indicate a draft 704 lifecycle state. Other optional fields in the event type schema may include: valid form date, valid until date, and notes if this schema version may be replaced by another version.

According to exemplary embodiments, the active 706 state may correspond to event type specification that may be made known to consumers 508 via a versioned schema (see, e.g., FIG. 6), and may be actively maintained. The event type schema may indicate an active 706 lifecycle state. The same schema version can be updated from draft 704 to active 706 state. In this exemplary embodiment, the optional fields in the event type schema should be updated to reflect the current state.

According to exemplary embodiments, the deprecated 708 state may correspond to event type specification that may be deprecated and may not be actively maintained, but may still be valid (events are still published conforming to such specification) and made known to consumers 508 via a versioned schema (see, e.g., FIG. 6). The event type schema may indicate a deprecated 708 lifecycle state. The same schema version can be updated from draft 704/active 706 to deprecated 708 state. In this exemplary embodiment, it may be advisable to update the "validUntil" field to inform users of the end of support date.

According to exemplary embodiments, the retired 710 state may correspond to event type specification that may be no longer valid (events conforming to such specification are no longer published), but the versioned schema may still be made known by the service provider 504. The event type schema may indicate a retired 710 lifecycle state.

Figure 8:
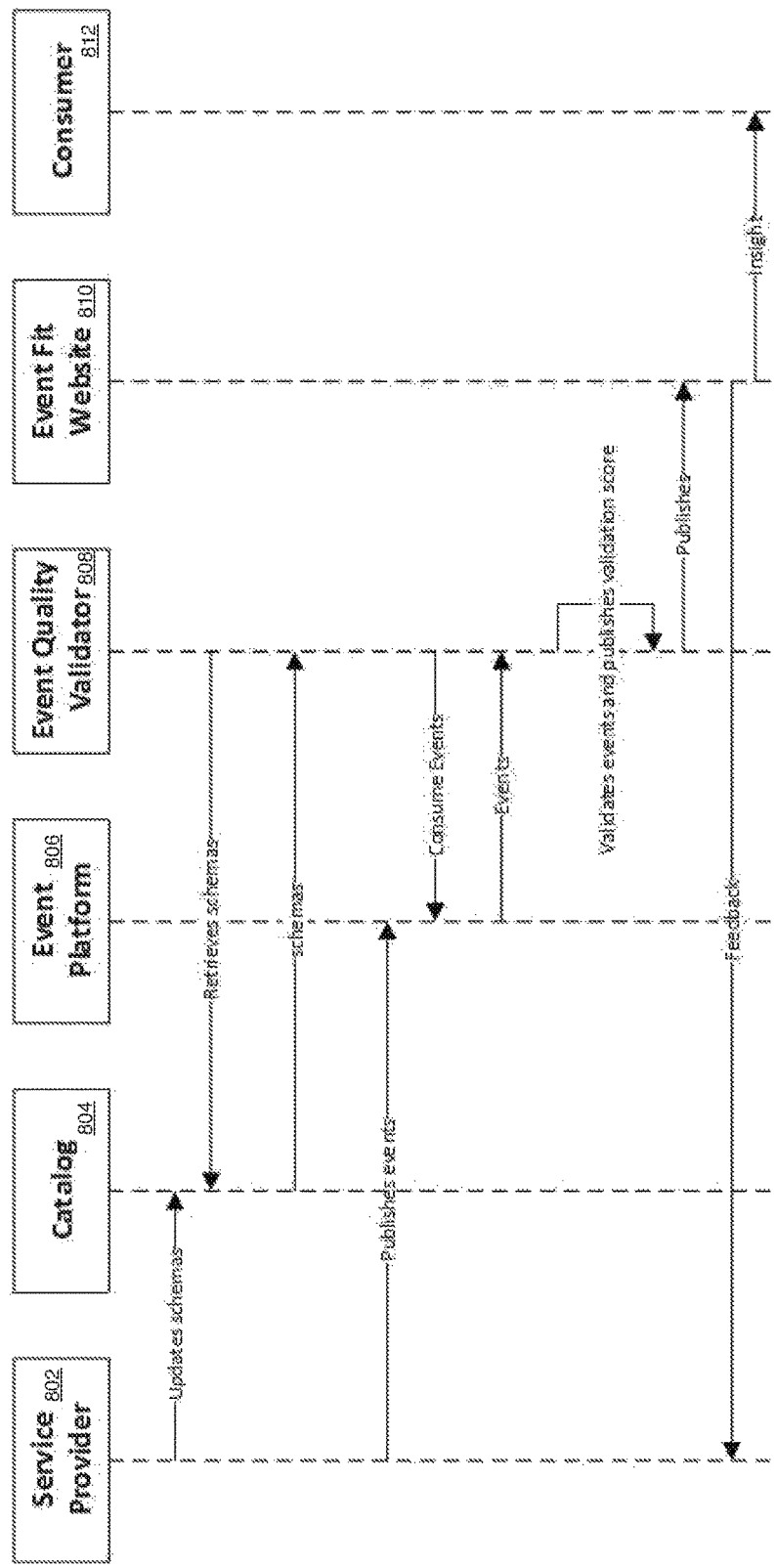
FIG. 8 illustrates an exemplary event fit representation in accordance with an exemplary embodiment.

FIG. 8 illustrates an exemplary event fit representation in accordance with an exemplary embodiment. According to exemplary embodiments, FIG. 8 represents one example of an end-to-end process from (1) the publishing of events by a service provider to the event platform, to (2) the validation and scoring of events by the event platform, to (3) the consumption of events by the consumers, but the disclosure is not limited thereto. The exemplary embodiments provide event maturity model allowing consumers to derive maximum value from the events from initial publication until they have matured enough to be used for automation. The exemplary embodiments also provide flexibility in allowing service providers to send events of different maturity levels. For example, the service providers may be able to publish events without actually publishing a schema as schema may only be required for mature events.

The exemplary embodiments also provide an iterative approach for service providers to define and communicate easily the set of events they publish and provide an indication of the events' reliability, e.g., using an event lifecycle standard allowing new version of event type to be introduced and old one to be retired gracefully.

As illustrated in the non-limiting exemplary event fit representation, in the process 800, the service provider 802 may update schemas and provide them to a catalog 804. The event quality validator 808 may retrieve schemas from the catalog 804. The service provider may then publish events to the event platform 806. The event quality validator 808 may consume the events from the event platform 806 and validate events and publish corresponding validation score and subsequently publish to an event fit website 810 for the consumer 812.

According to exemplary embodiments, result from event fit may be represented as follows:

```
{
  "serviceProviders":
    {
      "serviceProviderId": "85974",
      "serviceProviderName": "ServiceProviderA,
      "environments": [
        {
          "env": "dev",
          "eventTypes": [
            {
              "eventType": "com.organization.app.crash",
              "schemaUrl":
"https://89898.organization.com/schema/com.organization.app.crash?version=2.5",
              "maturityLevel: "FOUNDATIONAL",
              "lastCheck": "2020-02-02T02:02:02Z",
              "errors": [ ]
            }
          ]
        },
        {
          "env": "test",
          "eventTypes": [
            {
              "eventType": "com.organization.app.crash",
              "schemaUrl":
"https://89898.organization.com/schema/com.organization.app.crash?version=2.4",
              "maturityLevel: "BASIC",
              "lastCheck": "2020-02-02T02:02:02Z",
              "errors": [
                {
                  "description": "Field 'eventcontractversion' is missing."
                }
              ]
            }
          ]
        }
      ]
    }
}
```

According to exemplary embodiments, sample event schemas may be represented as follows:

```
{
  "schemas": [
    {
      "eventType: "com.organization.app.crash"
      "eventTypeSchemas" : [
        {
          "schemaUrl" :"/com.organization.app.crash?version=2.4-gfs",
          "lifecycleState" : "deprecated",
          "validFrom" : "2020-02-02T00:00:00Z",
          "validUntil" : "2020-12-02T00:00:00Z",
          "note" : "Replaced by schema /com.organization.app.crash?version=2.5-gfs"
        }
      ]
    }],
    "publicKeys" : [{
        "validFrom" : "2020-01-01T00:00:00Z",
        "validUntil" : "2020-12-31T23:59:59Z",
        "certificate": "..."
    }]
}
```

According to exemplary embodiments, schema for event schema may be represented as follows:

```
{
  "$schema": "http://json-schema.org/2019-09/schema#",
  "$id": "https://events-schema.organization.com/schema/catalog?version=1.0",
  "definitions": {
    "eventSchema": {
      "type": "object",
      "properties": {
        "eventType": {
          "type": "string",
          "description": "Event type",
        },
        "eventTypeSchemas": {
          "type": "array",
          "description": "Schemas for a specific event type",
          "items" : {
            "$ref": "#/definitions/eventTypeSchema"
          }
        }
      },
      "required": ["eventType", "eventTypeSchema"]
    },
    "eventTypeSchema": {
      "type": "object",
      "properties": {
        "schemaUrl": {
          "description": "Id of the event type schema provided by the Service Provider",
          "type": "string"
        },
        "lifecycleState": {
          "description": "Indicates the lifecycle state of this schema",
          "type": "string",
          "enum": ["draft", "active", "deprecated", "retired"]
        },
        "validFrom": {
          "description": "Indicates the date when this schema is valid",
          "type": "string"
        },
        "validUntil": {
          "description": "Indicates the date when this schema is retired",
          "type": "string"
        },
        "note": {
          "description": "Contains additional details about life cycle state",
          "type": "string"
        }
      },
      "required": ["schemaUrl", "lifecycleState"]
    }
  },
  "type": "object",
  "description": "All event schemas",
  "properties": {
    "schemas": {
      "type": "array",
      "description": "Event schemas",
      "items": {
        "$ref ": "#/definitions/eventSchema"
      }
    },
    "publicKeys" : {
      "type": "array",
      "description": "Public keys for event signature validation"
      "items": {
      }
    }
  },
  "required": ["schemas"]
}
```

Figure 9:
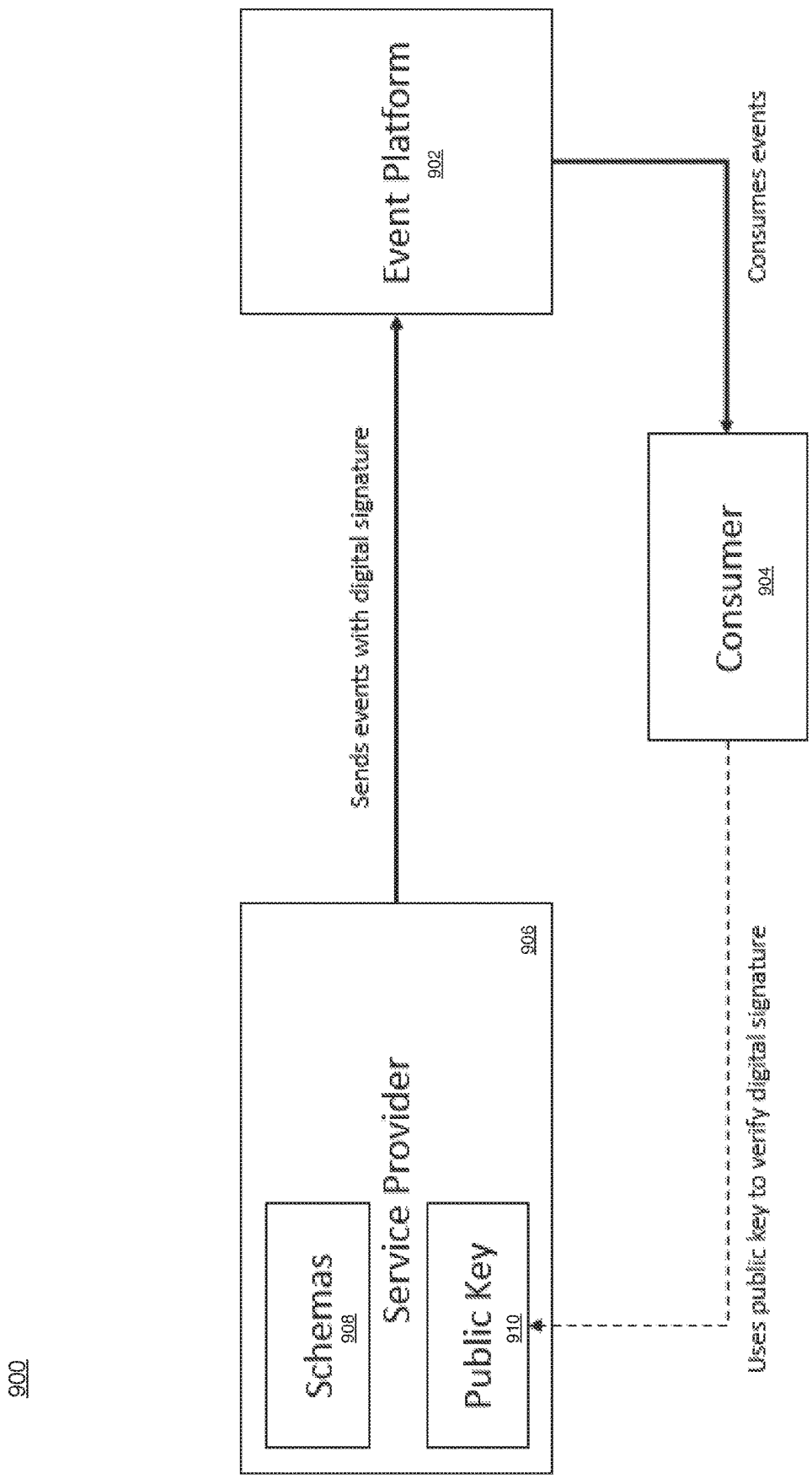
FIG. 9 illustrates an exemplary diagram of data integrity and encryption process in accordance with an exemplary embodiment.

FIG. 9 illustrates an exemplary diagram of data integrity and encryption process in accordance with an exemplary embodiment. As illustrated in FIG. 9, the process 900 shows interconnection and flow of data from a service provider 906 to a consumer 904 via an event platform 902. The service provider 906 may send events based on schemas 908 to the event platform 902 which are digitally signed via the provider's private key (i.e., events with digital signature). Consumers 904 may consume events from the event platform 902 which are digitally signed via the provider's private key. A public key 910 unit may use public key to verify the digital signature.

Figure 10:
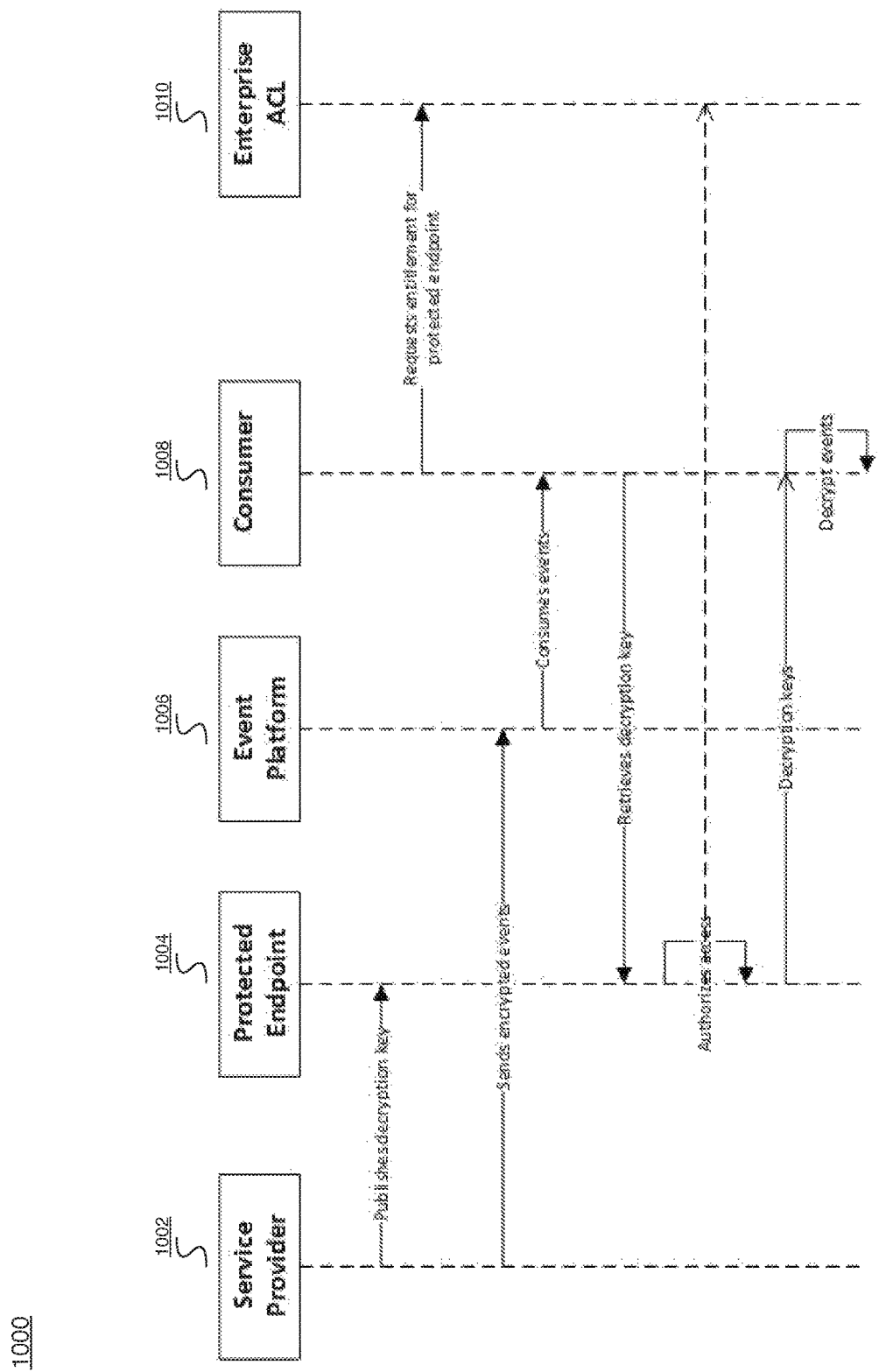
FIG. 10 illustrates an exemplary process of sending sensitive data in accordance with an exemplary embodiment.

FIG. 10 illustrates an exemplary process of sending sensitive data in accordance with an exemplary embodiment. As illustrated in FIG. 10, the process 1000 shows an exemplary event processes from a service provider 1002 to consumer 1008 via protected endpoint 1004 and event platform 1006. According to exemplary embodiments, in the process 1000, the service provider 1002 may publish decryption key onto the protected endpoint 1004; the consumer 1008 may request entitlement for protected endpoint from an enterprise ACL (access control list) 1010; the service provider 1002 may send encrypted events to the event platform 1006; the consumer 1008 may send request for retrieving decryption key, and the protected endpoint 1004 may authorize access and send the decryption key to the consumer 1008 for decrypting events for consumption.

According to exemplary embodiments, a non-transitory computer readable medium may be configured to store instructions for generation and management of cloud provider events. According to exemplary embodiments, the instructions, when executed, may cause a processor embedded within the CPEGM 406 or the CPEGD 402 to perform the following: allowing a service provider computing device to: define a maturity level of an event; publish an event schema associated with the maturity level of the event; and transmit the event to an event platform that is configured to provide infrastructure for event production and consumption. According to exemplary embodiments, the instructions, when executed, may cause the processor embedded within the CPEGM 406 or the CPEGD 402 to further perform the following: validating the event based on the event schema; calculating a validation score for the event upon validation of the event; publishing the event onto the event platform; and allowing a consumer computing device to consume the published event from the event platform. The processor may be the same or similar to the processor 104 as illustrated in FIG. 1 or the processor embedded within CPEGD 202, CPEGD 302, CPEGM 306, CPEGD 402, and CPEGM 406. According to exemplary embodiments, the processor may also be referred to as an event platform.

According to exemplary embodiments, the instructions, when executed, may cause the processor 104 to perform the following: publishing a list of available service providers in a cloud event catalog that is provided by an event platform computing device, the cloud event catalog describing each service provider's event via the service provider's event schema; and allowing the consumer computing device to receive information about availability and lifecycle state of event types.

According to exemplary embodiments, the instructions, when executed, may cause the processor 104 to calculate the validation score for each event type by utilizing the cloud event catalog.

According to exemplary embodiments, the published event may be relatively less matured and may include a new functionality, the instructions, when executed, may cause the processor 104 to perform the following: allowing the service provider to gradually mature the event or data contract in parallel to supported functionality provided by the service provider computing device, wherein the data contract may be granular and may be applied to the event or a subset of an attribute of the event.

According to exemplary embodiments, the instructions, when executed, may cause the processor 104 to further perform the following: publishing the validation score on a website; accessing the website by the service provider computing device for the event publication; and accessing the website by the consumer computing device for the event consumption.

According to exemplary embodiments, the instructions, when executed, may cause the processor 104 to further perform the following: automatically verifying, by the consumer computing device, the published event, the event's semantic, what data contract governs the published event, and whether the event is mature to a level for consumption that requires continuous monitoring; and consuming, by the consumer computing device, the published event based on the automatic verification.

According to exemplary embodiments, the instructions, when executed, may cause the processor 104 to execute standard data formats enabling the consumer computing device to receive information about the availability and the lifecycle state of the published event.

Figure 11:
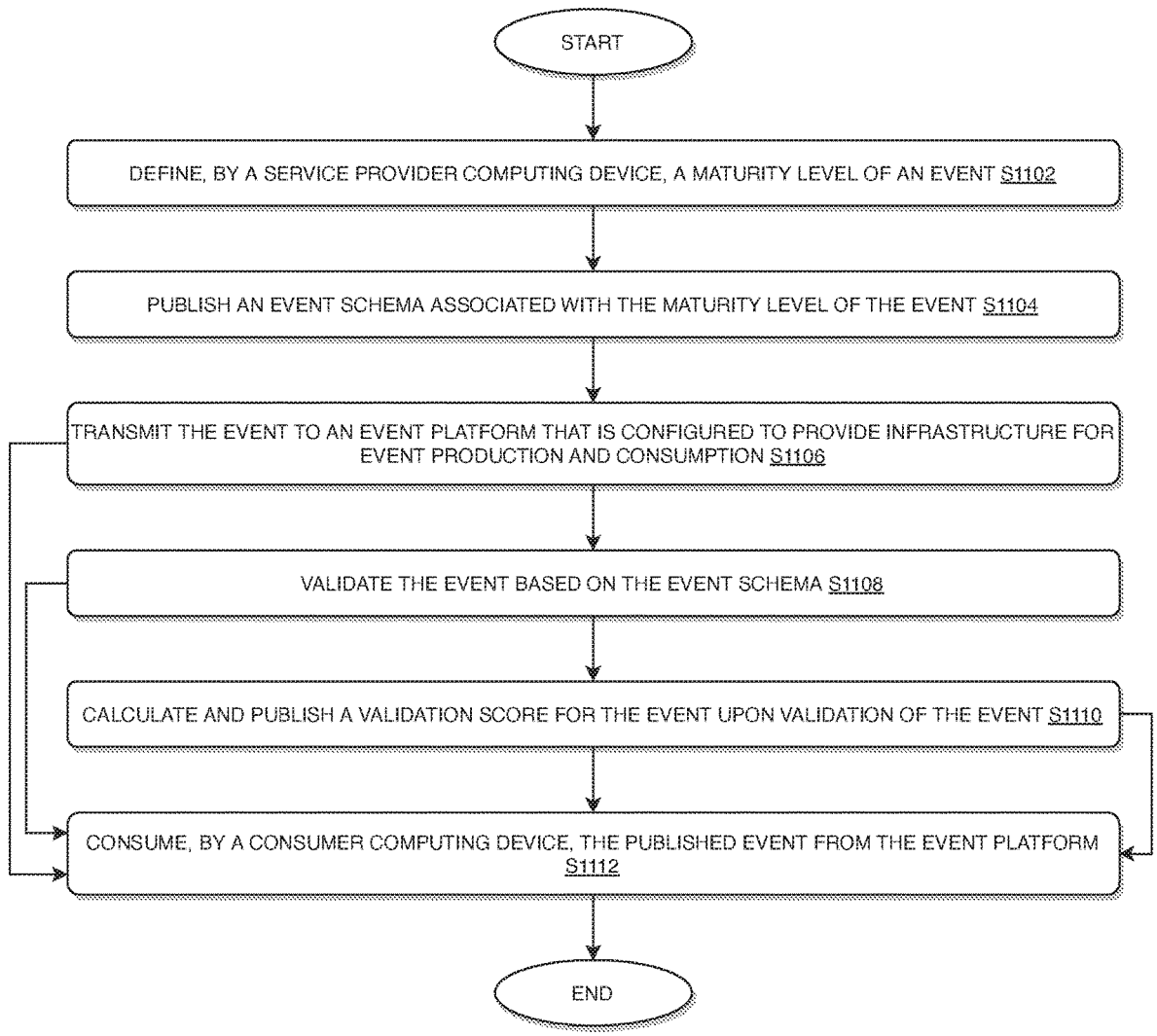
FIG. 11 illustrates an exemplary flow diagram of implementing a cloud provider events generation module in accordance with an exemplary embodiment.

FIG. 11 illustrates an exemplary flow diagram of implementing a cloud provider events generation module in accordance with an exemplary embodiment.

As illustrated in FIG. 11, in process 1100, at step S1102, a service provider computing device may define a maturity level of an event. At step S1104, an event schema associated with the maturity level of the event may be published. At step S1106, the event may be transmitted to an event platform that is configured to provide infrastructure for event production and consumption. At step S1108, the event based on the event schema may be validated. At step S1110, a validation score may be calculated and published for the event upon validation of the event. At step S1112, the published event may be consumed by a consumer computing device from the event platform. According to exemplary embodiments, step S1112 may happen any time after step S1106. That is, the published event may be consumed by a consumer computing device from the event platform any time after step S1106, or after step S1108, or after step S1110.

According to exemplary embodiments, the process 1100 may further include: publishing a list of available service providers in a cloud event catalog that is provided by the service provider computing device, the cloud event catalog describing each service provider's event via the service provider's event schemas; and receiving, by the consumer computing device, information about availability and lifecycle state of event types.

According to exemplary embodiments, the process 1100 may further include calculating the validation score for each event type by utilizing the cloud event catalog.

According to exemplary embodiments, the published event may be relatively less matured and may include a new functionality, the process 1100 may further include: executing gradual maturation of the event or data contract in parallel to supported functionality provided by the service provider computing device, wherein the data contract may be granular and configured to be applied to the event or a subset of an attribute of the event.

According to exemplary embodiments, the process 1100 may further include: publishing the validation score on a website; accessing the website by the service provider computing device for the event publication; and accessing the website by the consumer computing device for the event consumption.

According to exemplary embodiments, the process 1100 may further include: automatically verifying, by the consumer computing device, the published event, the event's semantic, what data contract governs the published event, and whether the event is mature to a level for consumption that requires continuous monitoring; and consuming, by the consumer computing device, the published event based on the automatic verification.

According to exemplary embodiments, the process 1100 may further include executing standard data formats enabling the consumer computing device to receive information about the availability and the lifecycle state of the published event.

According to exemplary embodiments as disclosed above in FIGS. 1-11, technical improvements effected by the instant disclosure may include platforms for implementing a cloud provider events generation module to standardize and ease the generation and management of service provider events via automation, thereby maximizing events' value for cloud consumers, but the disclosure is not limited thereto. In addition, according to exemplary embodiments as disclosed above in FIGS. 1-11, technical improvements effected by the instant disclosure may include platforms for implementing a cloud provider events module for enabling SPs to define and communicate easily the set of events they publish, how reliable they are and how to validate them via automation, but the disclosure is not limited thereto. Further, according to exemplary embodiments as disclosed above in FIGS. 1-11, technical improvements effected by the instant disclosure may include implementing a cloud provider events module to provide consumers with a machine consumable mechanism to find out which events are published, what are their semantic, what data contract governs them, and if they can be used for "eyes on glass" (i.e., requiring constant monitoring) consumption, automated alerting or automated operations, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generation and management of cloud service provider events by utilizing one or more processors and one or more memories, the method comprising:
   defining, by a service provider computing device, a maturity level of an event;
   publishing an event schema associated with the maturity level of the event;
   transmitting the event to an event platform that is configured to provide infrastructure for event production and consumption;
   validating the event based on the event schema;
   calculating a validation score for the event upon validation of the event;
   publishing the validation score on a website;
   consuming, by a consumer computing device, the published event from the event platform;
   automatically verifying, by the consumer computing device, the published event, the event's semantic, what data contract governs the published event, and whether the event is mature to a level for consumption that requires continuous monitoring; and
   consuming, by the consumer computing device, the published event based on the automatic verification.

2. The method according to claim 1, further comprising:
   publishing a list of available service providers in a cloud event catalog that is provided by an event platform computing device, the cloud event catalog describing each service provider's event via the service provider's event schemas; and
   receiving, by the consumer computing device, information about availability and lifecycle state of event types.

3. The method according to claim 2, further comprising:
   calculating the validation score for each event type by utilizing the cloud event catalog.

4. The method according to claim 1, wherein the published event is not matured and includes a new functionality, the method further comprising:
   executing gradual maturation of the event or data contract in parallel to supported functionality provided by the service provider computing device, wherein the data contract is granular and applied to the event or a subset of an attribute of the event.

5. The method according to claim 1, further comprising:
   accessing the website by the service provider computing device for the event publication; and
   accessing the website by the consumer computing device for the event consumption.

6. The method according to claim 1, further comprising:
executing standard data formats enabling the consumer computing device to receive information about the availability and the lifecycle state of the published event.

7. A system for generation and management of cloud service provider events, comprising:
a memory storing information for generation and management of cloud service provider events; and
a processor operatively connected to the memory via a communication network,
wherein the processor is configured to:
allow a service provider computing device to:
define a maturity level of an event;
publish an event schema associated with the maturity level of the event;
transmit the event to an event platform that is configured to provide infrastructure for event production and consumption;
validate the event based on the event schema;
calculate a validation score for the event upon validation of the event;
publish the validation score on a website; and
allow a consumer computing device to consume the published event from the event platform,
wherein the consumer computing device automatically verifies the published event, the event's semantic, what data contract governs the published event, and whether the event is mature to level for consumption that requires continuous monitoring; and
wherein the consumer computing device consumes the published event based on the automatic verification.

8. The system according to claim 7, wherein the processor is further configured to:
publish a list of available service providers in a cloud event catalog that is provided by an event platform computing device, the cloud event catalog describing each service provider's event via the service provider's event schemas; and
allow the consumer computing device to receive information about availability and lifecycle state of event types.

9. The system according to claim 8, wherein the processor is further configured to calculate the validation score for each event type by utilizing the cloud event catalog.

10. The system according to claim 7, wherein the published event is not matured and includes a new functionality, the processor is further configured to:
allow the service provider to gradually mature the event or data contract in parallel to supported functionality provided by a service provider computing device, wherein the data contract is granular and applied to the event or a subset of an attribute of the event.

11. The system according to claim 7, wherein the processor is further configured to:
wherein the service provider computing device accesses the website for the event publication; and
wherein the consumer computing device accesses the website for the event consumption.

12. The system according to claim 7, wherein the processor is further configured to execute standard data formats enabling the consumer computing device to receive information about the availability and the lifecycle state of the published event.

13. A non-transitory computer readable medium configured to store instructions for generation and management of cloud service provider events, wherein when executed, the instructions cause a processor to perform the following:
allowing a service provider computing device to:
define a maturity level of an event;
publish an event schema associated with the maturity level of the event;
transmit the event to an event platform that is configured to provide infrastructure for event production and consumption;
validating the event based on the event schema;
calculating a validation score for the event upon validation of the event;
publishing the validation score on a website; and
allowing a consumer computing device to consume the published event from the event platform,
wherein the consumer computing device automatically verifies the published event, the event's semantic, what data contract governs the published event, and whether the event is mature to a level for consumption that requires continuous monitoring; and
wherein the consumer computing device consumes the published event based on the automatic verification.

14. The non-transitory computer readable medium according to claim 13, wherein when executed, the instructions further cause the processor to perform the following:
publishing a list of available service providers in a cloud event catalog that is provided by an event platform computing device, the cloud event catalog describing each service provider's event via the service provider's event schemas; and
allowing the consumer computing device to receive information about availability and lifecycle state of event types.

15. The non-transitory computer readable medium according to claim 14, wherein when executed, the instructions further cause the processor to perform the following:
calculating the validation score for each event type by utilizing the cloud event catalog.

16. The non-transitory computer readable medium according to claim 13, wherein when executed, the instructions further cause the processor to perform the following:
wherein the service provider computing device accesses the website for the event publication; and
wherein the consumer computing device accesses the website for the event consumption.

17. The non-transitory computer readable medium according to claim 13, wherein when executed, the instructions further cause the processor to perform the following:
executing standard data formats enabling the consumer computing device to receive information about the availability and the lifecycle state of the published event.

* * * * *